(12) United States Patent
Qian et al.

(10) Patent No.: US 6,930,992 B2
(45) Date of Patent: Aug. 16, 2005

(54) HYBRID CDM/TDM SIGNALING FOR PACKET ACKNOWLEDGMENT

(75) Inventors: Feng Qian, Mission Viejo, CA (US); Stanislaw Czaja, Cardiff, CA (US)

(73) Assignee: VIA Telecom Co., Ltd. (KY)

( * ) Notice: Subject to any disclaimer, the term of this patent is extended or adjusted under 35 U.S.C. 154(b) by 0 days.

(21) Appl. No.: 10/866,008

(22) Filed: Jun. 10, 2004

(65) Prior Publication Data

US 2004/0264420 A1 Dec. 30, 2004

Related U.S. Application Data

(60) Provisional application No. 60/480,474, filed on Jun. 19, 2003.

(51) Int. Cl.[7] .............................................. H04B 7/216
(52) U.S. Cl. ........................ 370/342; 370/236; 370/335
(58) Field of Search ................................ 370/236, 328, 370/329, 330, 335, 336, 337, 342, 343, 345, 348, 522

(56) References Cited

U.S. PATENT DOCUMENTS

| | | | |
|---|---|---|---|
| 5,267,244 A | | 11/1993 | Messerschmitt et al. |
| 5,278,992 A | | 1/1994 | Su et al. |
| 5,398,258 A | | 3/1995 | Su et al. |
| 6,434,367 B1 | * | 8/2002 | Kumar et al. .................. 455/70 |
| 6,507,572 B1 | * | 1/2003 | Kumar et al. ................. 370/335 |
| 6,571,101 B1 | * | 5/2003 | Schulz ......................... 455/450 |
| 6,757,270 B1 | * | 6/2004 | Kumar et al. ................. 370/342 |

OTHER PUBLICATIONS

"Physical Layer Standard for cdma2000 Spread Spectrum Systems", 3GPP2 C.S0002–C, Version 1.0, Release C, pp. 1–2–1–3, 1–5–1–6, 1–9–1–12, 1–14–1–15, 1–17, 1–19, 1–21, 1–23, 2–55, 2–68, 2–71–2–72, 2–81, 2–140–2–146, 2–148, 2–161–2–162, 2–173, 2–179, 2–186–2–187, 2–221–2–224, 3–7–3–8, 3–18, 3–23, 3–37, 3–107–3–109, 3–133, 3–137, 3–145–3–149, 3–163, 3–173, 3–200, and 3–202, May 28, 2002.

* cited by examiner

*Primary Examiner*—Bob A. Phunkulh
(74) *Attorney, Agent, or Firm*—Jaquez & Associates; Michael J. Jaquez, Esq.; William C. Boling, Esq.

(57) ABSTRACT

A method and apparatus to provide a common signaling channel (CSC) for concurrently signaling a multiplicity of different mobile stations (MSs) to facilitate data communications with a base station (BS). Superframes of the CSC have a length related to the period of corresponding data channel frames, so that disposing signaling information units (SIUs) in a superframe may imply relevance to particular data frames. Each CSC superframe is multiplexed by time (TDM) into subframes, which are further multiplexed by code (CDM). Symbols representing the same SIU may be disposed in plural subframes to provide time diversity. The number of subframes per superframe may be selected to reduce impairment of CDM code orthogonality, and/or to permit using an integer power of two number of symbols within each subframe. A CSC may, for example, provide ACK information for data from numerous MSs, supporting H-ARQ for reverse link transmissions.

20 Claims, 3 Drawing Sheets

HYBRID CDM/TDM SIGNALING FOR PACKET ACKNOWLEDGMENT

This application claims priority under 35 USC 119 to U.S. Provisional Application No. 60/480,474, filed Jun. 19, 2003 and entitled "Hybrid CDM/TDM Signaling for Forward Link CDMA System," the contents of which are hereby incorporated in their entirety by reference.

BACKGROUND OF THE INVENTION

1. Field of the Invention

This invention generally relates to wireless communications, and more specifically to communications systems that transfer data between a base station and a multiplicity of user stations.

2. Related Art

The state of the art for CDMA communications systems is substantially reflected in documents published by standardization bodies. The primary published standard that preceded the subject matter presented herein is identified as 3GPP2 C.S0002-C, "Physical Layer Standard for cdma2000 Spread Spectrum Systems," published May 28, 2002, which is hereby incorporated in its entirety by reference. According to that standard, CDMA cellular communications devices may be enabled for high-speed packet data together with voice communication. Devices so enabled shall include a number of different physical channels. Although the method and apparatus presented herein were developed in this context, those skilled in the wireless communications art shall recognize that the improvements are applicable to other systems as well. A salient characteristic of such systems is their provision for packet data transfers between a base station and numerous mobile (or user) stations.

As is well known, cellular communications systems generally employ portable transceivers, each of which is called a mobile station ("MS"), for user communications. Such systems are one-to-many in nature, and generally include a relatively modest number of base stations ("BSs") that each communicate with many MSs. The BSs are disposed as needed throughout geographical areas, to satisfy user demands for range and connection volume. For cellular systems providing high-speed packet data communications, the BS infrastructure must also satisfy user requirements for data volume.

Cellular system capacities are constrained by a variety of factors, such as the RF spectrum available to them, which limit the number of MSs that each BS can service. The economic value of a base station depends upon the number of MSs that can be concurrently served by the base station at a given level of quality of service. Thus, there is a need to increase the number of MSs that a base station is capable of serving, within system constraints based upon bandwidth availability and quality of service requirements.

To receive information accurately, wireless communications systems require an adequate signal-to-noise ratio (SNR). CDMA systems equivalently require a sufficient $E_C/I_0$ (energy per chip divided by the total energy within the spectral band used by the signal). With respect to a subject MS, the power of transmissions from its serving BS to other MSs appear as an increase in the total energy within the relevant spectral band, causing a decrease in the $E_C/I_0$ as measured by the subject MS. Thus, in the interest of increasing the number of MSs that can be served, and the rate of data transfer that can be provided, it is desirable for communications to take place at the lowest power levels that provide reliable operation.

Various efficiency-enhancing techniques have been implemented in cellular systems to help satisfy the need for high-speed data transmission at minimal power levels. For example, rather than transmit at a power that is sufficient to ensure accurate reception of every data packet, downlink data transmissions from a BS to an MS typically use an H-ARQ (hybrid automatic request for retransmission) procedure, whereby an MS will request retransmission when a particular packet is lost. Transmit power levels can thus be reduced until some packets are lost due to statistical noise variations. The resulting reduction in average transmission power levels frees capacity that may be used to accommodate additional users.

H-ARQ procedures may be implemented to improve an efficiency of high-speed data transfers on the reverse link (RL), whereby the BS will request retransmission from an MS in the event of a dropped packet. This imposes a requirement for a BS to acknowledge, on a forward link channel, data packets received from an MS. In order to conserve bandwidth, both in terms of transmission power and quantity of data overhead, the RL H-ARQ system needs to be efficient and reliable, which in turn requires that the forward link acknowledgement be maximally reliable with minimal transmission power requirements. In response to this need, a signaling method and apparatus is disclosed herein that may be implemented in a cellular communications system to improve the efficacy of cellular system RL data communications by reducing the overhead required to effect automatic retransmission.

SUMMARY

A method and apparatus is described herein for more efficient shared signaling channels for use primarily with wireless communication system forward links from a base station ("BS") to a multiplicity of mobile stations ("MSs").

One embodiment is a method of transmitting a multiplicity of signaling information units (SIUs) from a BS to a corresponding multiplicity of receiving MSs via a single common signaling channel ("CSC"). The common signaling channel is organized in superframes having a length determined by a period of frames of a data channel to which the signaling information units pertain. The method includes time division multiplexing ("TDM") the CSC superframes into subframes, and also includes further code division multiplexing (CDM) the subframes into a plurality of orthogonal CDM symbols representing SIUs relevant to particular receiving MSs.

Another embodiment includes apparatus for implementing a hybrid TDM/CDM common signaling channel, including a module for determining data channel alignment, and for determining a length and time alignment of primary frames of a multiplicity of data channels. This embodiment also includes a signaling channel signal preparation module configured to prepare a signal to convey a multiplicity of different signaling information units (SIUs), each corresponding to one of the multiplicity of data channels, for concurrent transmission from the BS via a common signaling channel (CSC), and includes a time division multiplexing (TDM) module configured to dispose SIUs into a plurality of different subframe periods within a superframe period having a duration substantially matching the length of the primary frames of the corresponding data channel. The signal channel preparation module also includes a coding module configured to encode the subframe SIUs into signaling channel signal segments as code division multiplexed (CDM) symbols for transmission via the CSC.

BRIEF DESCRIPTION OF THE DRAWINGS

Embodiments of the present invention will be more readily understood by reference to the following figures, in which like reference numbers and designations indicate like elements.

DETAILED DESCRIPTION

Introduction

Figure 1:
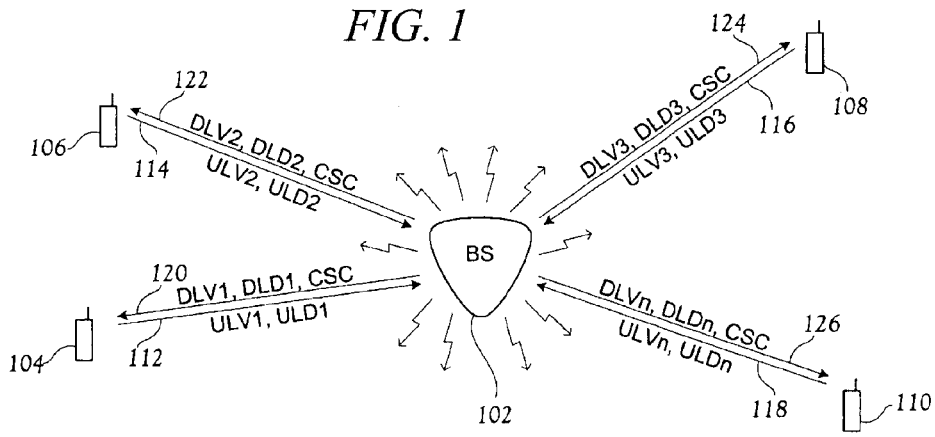
FIG. 1 is a diagram representing wireless communications between a base station (BS) and a multiplicity of mobile stations (MSs).

Many wireless communications systems, and particularly cellular systems, seek to improve high-speed data communication speeds between units. In order to operate at a minimal transmission power level without sacrificing data integrity, H-ARQ (hybrid automatic retransmission request) procedures may be employed with respect to data transmissions in one or both directions. The benefits of automatic retransmission are obtained at a cost of increased overhead that is required for a receiving station to inform the sending station of the status of received packets. An improved method and apparatus for a common signaling channel ("CSC") is set forth below, which may be employed to convey such status information (acknowledgements). Details are described that are directly applicable to a CDMA cellular telephone system, which, as an exemplary wireless communication system, provides the context for at least one preferred embodiment of the method and apparatus described herein.

H-ARQ protocols may be useful for reverse link (RL) data transmissions from mobile stations (MSs) to base stations (BSs). Typical H-ARQ implementation for data transfer in one direction requires the transmission, in the other direction, of acknowledgement of correctly received data. Acknowledge information (or "ACK") generally requires very little data, and indeed is often implemented as merely the presence or absence of a signal on a particular channel. ACKs are most useful if conveyed promptly so that the data source need not retain previously transmitted data for a long period while awaiting acknowledgment that the data was correctly received.

ACKs are typically organized into a frame structure in preparation for transmission. If the frame structure has a duration that matches the duration or period of relevant data frames (the data from which is being acknowledged), and if the ACK frames are transmitted at a predetermined time after such relevant data frames, then a significant amount of data may be conveyed implicitly. By simply disposing ACKs in a frame having a predetermined timing relationship to a frame (or packet) of data being acknowledged, explicit identification of the particular frame (or packet) to which the ACK applies is rendered unnecessary. Explicit frame identification would require more information than is needed for the ACK itself. Accordingly, there is strong motivation to base an ACK channel frame structure on the frame structure of the channel for which data is being acknowledged, and to establish a known timing relationship between ACKs and the acknowledged data.

An ACK, of course, is necessarily specific to a particular unit of data (e.g., a frame or packet of data) that is being acknowledged. For example, an ACK may be specific to the data of a particular frame of a particular data channel. Yet, for efficiency, the ACK desirably contains far less data than does the acknowledged data unit. Accordingly, the ACK will preferably be transmitted on a channel having a very low data rate compared to a data rate of the data channel. Such a very low data-rate channel may be established by extensive multiplexing of a common signaling channel (CSC).

In an exemplary CDMA system embodiment, for example, forward link ("FL," i.e., from a BS to an MS) ACK data may be conveyed to an MS from which the BS is receiving packet data on a special FL channel, which is designated a Forward Link Common Acknowledgment Channel ("F-CACKCH"). Such a channel is one-to-many, intended to provide information that is specific to each of a large number of different receiving stations. Thus, acknowledgement information specific to n different MSs may be transmitted concurrently on such FL channel. Due to considerations beyond the scope of this paper, the exemplary CDMA system will preferably provide a positive acknowledgement ("ACK") or a negative acknowledgement ("NACK"), as appropriate, to each of 96 different MSs in the same frame of the F-CACKCH. This preference may be achieved by multiplexing the F-CACKCH to function as 96 distinct channels. The skilled person will understand that the F-CACKCH (or other CSC) may be multiplexed into any number of effective channels, within bandwidth constraints, with the implementation of corresponding changes to other features as necessary.

The desired multiplexing of the F-CACKCH may be effected, for example, using either code division multiplexing ("CDM") or time division multiplexing ("TDM") techniques. Reverse link ("RL," i.e., from an MS to a BS) data may be transmitted in the exemplary CDMA system using a frame having a duration of 10 mS. Accordingly, the F-CACKCH also has a 10 mS framing structure in order to implicitly identify the, specific frame of a data channel to which an ACK pertains. Employing well-known Walsh codes, or other distinguishable coding schemes, a single 10 mS frame of the F-CACKCH may be subdivided into 96 CDM (code-distinguished) subchannels, each CDM subchannel conveying one acknowledgment per frame. For example, the F-CACKCH may employ two symbols to convey an ACK, in which case 192 symbols will be required to convey ACKs for 96 subchannels. Within a 10 mS frame, 192 distinguishable symbols may be conveyed using a length 64 Walsh code pattern. Two symbols will convey a unit of information (e.g., ACK) for one subchannel. Each active MS may be assigned to one of the 96 F-CACKCH subchannels thus established, by means of higher-level protocol signaling.

However, a problem may arise for such CDM subchannels when the transmission is subject to fading, particularly when the fading is due to relative movement between the transmitting and receiving stations. Relative velocities between a BS and an MS in a cellular system may readily reach 100 km/hr, which will cause Doppler-effect fading at a rate of approximately 200 Hz. Accordingly, two full fading periods may be encompassed within a single 10 mS frame. It is likely that orthogonality of the different codes will be lost under such fading circumstances, causing excessive detection errors. Significant errors on the F-CACKCH may severely impair data transmission integrity, particularly considering that the data transmission itself is subject to the deleterious fading environment.

To avoid impairment of the data integrity, time division multiplexing (TDM) may be employed instead of CDM. The basic 10-mS frame may be multiplexed into 96 TDM subchannels by subdividing the 10 mS frame into 96 subslots, each TDM subslot having a duration, for example, of about 104 μS. Such an arrangement would solve the Doppler fading issue, because expected MS movement would not cause significant fading over such a short period of time. However, such TDM subdivision creates a higher peak to average power than CDM transmission, as explained below.

Substantial average power savings may be realized by sending a signal on the F-CACKCH only when required to indicate a negative acknowledgement ("NACK"), which is expected to be less commonly required than a positive acknowledgement ("ACK"). In this manner, a majority of acknowledgement information (i.e., the more common positive ACKs) may be conveyed expending no transmission power at all, because only NACKs employ transmission power. Accordingly, in a TDM F-CACKCH, 104 μS bursts of transmission power will appear occasionally in an otherwise silent channel, creating an undesirably high peak-to-average ratio for the channel signal. Thus, if ACKs (no signal) are sent many times more frequently than NACKs (signal present), then the resulting peak-to-average power ratio of the F-CACKCH will significantly increase. As is well known, high peak-to-average ratio signals exacerbate problems of transmitter distortion and co-channel interference.

Irrespective of the potential loss of code orthogonality for 10 mS symbol periods, multiplexing the F-CACKCH into 96 subchannels is inconvenient. In general, orthogonal codes may be implemented more efficiently by dividing a particular channel into a number $N_{CS}$ of CDM symbols, where $N_{CS}$ is 2 raised to an integer power. Thus, for example, it will be more efficient to divide a channel into 64 or 128 CDM symbols, rather than into 96 or 192 CDM symbols.

Overview

A generalized method of providing an efficient common signaling channel (CSC), as well as appropriate apparatus therefor, is presented below. The method and apparatus addresses some of the difficulties identified above. Such an efficient CSC will be particularly useful for relatively low-data rate signaling information that corresponds implicitly to a frame structure designed for a higher data-rate channel, such as a voice or high-speed data communication channel. In the exemplary CDMA communication system, the F-CACKCH may be configured as a CSC to efficiently and accurately provide concurrent ACKs in respect of a large number of different RL data channels. However, CSCs may be employed for many other purposes, both in other CDMA systems and in other types of communications systems having a cellular, one-to-many architecture. In regard to RL data communications, for example, a CSC may be employed to direct modification of communication parameters (such as transmit power, modulation, or coding scheme) on a nearly per-frame basis. In regard to DL data communications, a CSC may be employed to indicate low-rate, frame-relevant information, such as whether a near-future data frame will include information for a particular MS, or to indicate that a change, such as in coding scheme or Walsh space, will be made to signals for data directed to a particular MS.

FIG. 1 illustrates features of a general cellular communications system, including a base station (BS) 102 capable of bidirectional voice and data communication with a multiplicity of mobile stations (MSs). Examples of MSs are represented by MS1 104, MS2 106, MS3 108, and MSn 110. MSn 110 represents the n device serviced by the BS 102. In exemplary CDMA cellular systems, n may be, for example, 96 or 192. For visual clarity the BS 102 is shown in the geographic center of the represented MSs, but in practice these related MSs may be served by a single sector of a BS, covering for example just 120 degrees angle from the BS 102.

Uplink ("UL") transmissions 112 from MS1 104 to the BS 102 may include transmissions over a voice channel such as is represented by "ULV1," and/or over one or more data channels, as represented by "ULD1." UL transmissions 114, 116 and 118 from MSs 106, 108 and 110 respectively, similarly may include transmissions over a representative voice channel "ULV*," and/or over a representative data channel "ULD*," where * represents an integer that may be arbitrarily chosen to designate the particular MS. Downlink ("DL") transmissions 120, 122, 124 and 126 similarly may include a voice channel, represented by DLV* (* the MS-designating integer), and/or one or more data channels, represented by DLD*, from the BS 102 to MSs 104, 106, 108 and 110, respectively.

Each MS 104–110 also receives DL transmissions over a common signaling channel ("CSC"). A CSC may be distinguished by a combination of some of the following characteristics. A CSC may convey information, at relatively low rates, to a relatively large number of MSs to which the CSC is "common." CSC signaling information may be limited to channel administration tasks, rather than conveying actual data, such as voice or file data, between users. CSC signaling information units (SIUs) may be relevant to particular data frames (or packets) on particular channels. A CSC may convey such relevance implicitly by disposing the SIUs within a CSC superframe having a predetermined timing relationship to the relevant data frame (or packet). The predetermined timing relationship may include making a duration of the superframe substantially equal to a period or duration of the relevant data frame or packet, and/or may include transmitting a CSC superframe at a predetermined time with respect to the relevant data frame or packet. A CSC may be limited to conveying SIUs that are each unique to particular MSs. Particular characteristics that may be typical of a CSC are, nonetheless, not required in all embodiments. In some embodiments, for example, a CSC may carry data between users, particularly at low rates. In some embodiments, a CSC may be common to a modest multiplicity of MSs. Also, in some embodiments, SIUs may be common to more than one MS.

Because a CSC is "common," the CSC is indicated in FIG. 1 without a numeral suffix that corresponds to a target MS. Nonetheless, the CSC will typically convey information uniquely and individually relevant to each of the multiplicity of MSs that share the CSC. The exemplary F-CACKCH, for example, will desirably convey either an ACK or a NACK to each of up to 96 different MSs during a single frame period of a UL data channel. Thus, the F-CACKCH is highly multiplexed, conveying information to corresponding MSs on each of 96 (in the exemplary embodiment) distinct subchannels. During connection setup, higher processing level information enables each MS that shares the F-CACKCH to identify the relevant portion(s) or subchannel(s) of the F-CACKCH. Typical CSCs are similarly highly multiplexed to provide distinct subchannels to many MSs or users.

Implicit Framing Relationships

Figure 2:
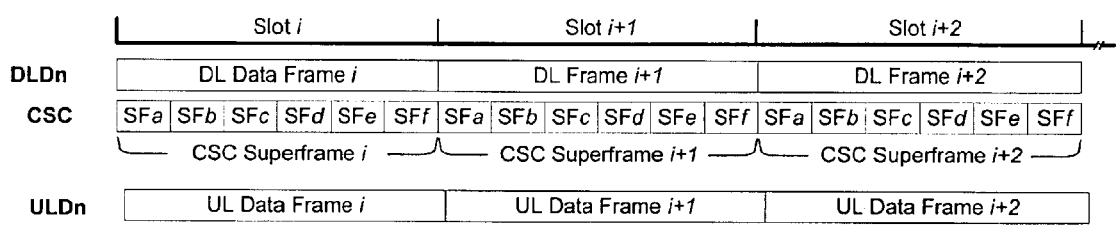
FIG. 2 illustrates relationships between framing of a common signaling channel (CSC), and framing of representative related data channels.

FIG. 2 illustrates a frame structure showing CSC superframes and exemplary subframes. Each CSC superframe i, i+1 and i+2 encompasses a plurality of subframes. In the example illustrated, each CSC superframe encompasses six subframes SFa–SFf. Superframes comprising six subframes are convenient for the exemplary CDMA system, permitting 96 CSC subchannels to be conveyed (using two symbols per subchannel) within a single CSC superframe. Each such subframe requires a capacity of only 32 CDM symbols. Thus, the subframes may be divided into a convenient and efficient (2 to an integer power) number of CDM symbols.

The slots of FIG. 2 may have any duration; in the exemplary CDMA system, F-CACKCH superframes have a 10 mS length matching that of UL Data Frames. As shown in FIG. 2, each CSC superframe is divided by TDM into six subframes. In the exemplary CDMA system, therefore, each CSC (F-CACKCH) subframe is less than 1.7 mS long. Because the CDM code lengths are limited to the subframe duration, code orthogonality is accordingly less likely to be lost due to relative motion. For subframe lengths less than 1.7 mS long, no more than ½ fading period will be experienced in the exemplary system due to relative motion between an MS and its BS of up to 150 km/hr (about 90 mph).

FIG. 2 also illustrates typical relationships between a CSC and frames of a related data channel, as viewed at a BS. For example, the CSC may provide ACK information for a UL data channel having a frame structure as shown for the representative UL data channel ULDn. Viewed at the BS, a UL data channel slot (e.g., slot i) will tend to be offset with respect to a corresponding DL timing slot i. Such offset may be due to the propagation delays, such as signal travel time, between transmission of a DL frame (or pilot sequence) and arrival of a UL signal that was aligned with the DL frame at the MS. The offset may also be substantially due to alignment offsets (e.g., PN offsets) that are intentionally imposed on selected MSs for reasons of system efficiency. In FIG. 2 such offsets are reflected in a visible lag of UL data frames (as viewed from the BS), compared to the timing of slots i, i+1 and i+2.

Typically, relevance of SIUs to particular frames of a corresponding data channel is implied by the transmission time of the CSC superframe containing the SIUs. In the exemplary CDMA system, for example, SIUs of the F-CACKCH convey ACK information. Transmitting an ACK within CSC (or F-CACKCH) Superframe i+2, for example, implies that the ACK is relevant to a particular frame (e.g., Data Frame i) of the corresponding data channel. Such implicit information may be conveyed by any predetermined mapping between CSC superframes and frames of the corresponding data channel that is accepted by both BS and MS. The specific mapping may be selected to satisfy engineering considerations. As examples of such considerations, data storage requirements may be reduced by transmitting ACKS as quickly as possible after the relevant data packet or frame is decoded, but some extra delay may be useful to ensure that the predetermined timing relationship may be maintained over unusual channel conditions. The time relationship between CSC superframes and the relevant UL data frame will typically be established during connection setup.

Alternative Embodiments

In the exemplary embodiment, the CSC (F-CACKCH) conveys SIUs (ACK information) related to a previous frame of a UL data channel, but there are many other possibilities. CSC SIUs may convey information relevant to particular MSs for future (rather than previous) UL data frames, such as permission to transmit in particular frames, or instruction to effect a change in modulation scheme, Walsh space, or transmit power level beginning in a particular future frame. In such a case, SIUs transmitted within CSC Superframe i may, for example, be relevant to UL Data Frame i+1 or i+2.

As another example, a CSC may convey SIUs that are relevant to a DL data channel, rather than to a UL data channel. Such SIUs may indicate, for example, whether a particular frame will include information relevant to a particular MS, what portion of data in such frame is relevant, or the coding or modulation scheme that will be employed in such frame. Thus, any information that is relevant to particular frames of another channel may benefit from transmission via a CSC, particularly low-rate information that is individually specific to numerous different MSs (or numerous groups of MSs).

It should also be noted that, although FIG. 2 refers only to data channels, a voice channel in a digital system is a data channel conveying data that is representative of a voice. Thus, the illustrated data channels DLDn and ULDn generally represent any communication channel to which SIUs of a CSC are implicitly relevant.

In FIG. 2, data frames to which the CSC relates are shown as continuous (i.e., concatenated with each other). This need not be the case. Instead, relevant data frames may occur periodically, at a predetermined period. For example, an agreed protocol may establish that only even UL data frames, such as UL Data Frames i, i+2, and so on, are relevant to a particular CSC. In such case, the superframe length for the CSC may be determined to match the period between relevant data frames, rather than matching the duration of relevant data frames. Thus, in the example, superframes of the CSC may match the two-slot periods of the relevant data frames, without impairing the ability of SIU transmission within a particular CSC superframe to implicitly identify the frame of the corresponding data channel to which the SIU is relevant.

In some embodiments, the frames indicated in FIG. 2 may include some time for alignment and power-control features, such as ramp-up and ramp-down periods at a beginning and/or end of a frame, and/or for a preamble, typically at a beginning of a frame. Such features are not employed in the exemplary CDMA system, which rely on a pilot signal for alignment, but may or may not be present in any other particular embodiment of a CSC. The use of preambles, alignment symbols, and power control features may cause the timing of CSC frames to differ somewhat from the timing of frames or packets of the corresponding data channel. However, the skilled person can readily dispose preambles and other special signal features as required, whether for frames, or for frame groups, in a particular system. Accordingly, such features are not discussed further hereinbelow.

Further Subframing Benefits

At least two additional benefits may follow from division of a CSC superframe (based on a frame duration or period of a corresponding data channel) into a plurality of subframes. First, such subdivision may permit the number of CDM symbols that the channel is configured to convey during each subframe to be an integer power of 2, such as 16, 32, 64, etc. Sometimes it will be desirable to divide a CSC into a number of subchannels that does not lend itself to use of a convenient integer power of 2 number of CDM symbols. Indeed, such is the case with the 96 subchannels desired for the exemplary CDMA system. In this case, by dividing the superframe into a multiple of 3 subframes, the number of symbols that each subframe is configured to convey may be set to an integer power of 2. In other embodiments, of course, other divisions may be necessary to enable efficient use of an integer power of 2 number of symbols in each subframe, if this is desired. In some cases it may even be useful to establish subframes of different lengths within a single CSC superframe.

Second, information for each CSC subchannel (i.e., for each receiving MS), may be repeated within the same superframe period, thereby enhancing a probability of accurate detection of the information by time diversifying the signal. As described previously, system efficiency may be highly dependent upon the integrity of information conveyed via the CSC. Time diversity of the CSC signals will reduce the power levels at which the CSC must be transmitted to ensure accurate reception. In some embodiments, time diversity may be employed only for MSs that are receiving less effectively. This flexibility may be particularly useful in view of the large number of different MSs that may share a CSC, which will generally entail tolerating a wide range of channel conditions, from strong to weak and variable. The weaker and more variable channels may particularly benefit from time diversity. For such channels, the information units (e.g., ACK or NACK) may be repeated once, twice, or even in every subframe, within a given CSC superframe.

Reverse link data channels (relevant to the F-CACKCH) are structured in frames having a length of 10 mS in the exemplary CDMA cellular system. The frame of the F-CACKCH in the exemplary CDMA system may be multiplexed, for example, into 96 or 192 subchannels. If time diversity of two is employed for each subchannel, then 96 different MSs may receive acknowledgment information on the F-CACKCH. A single CDM symbol may suffice to convey ACK or NACK to each of the different MSs. Despite the overall division into 96 time-diversified (or 192 non-time-diversified) different subchannels, an efficient and convenient 32-symbol (integer power of two number of symbols) code may be employed to code multiplex each subframe.

Base Station Apparatus Features

Figure 3:
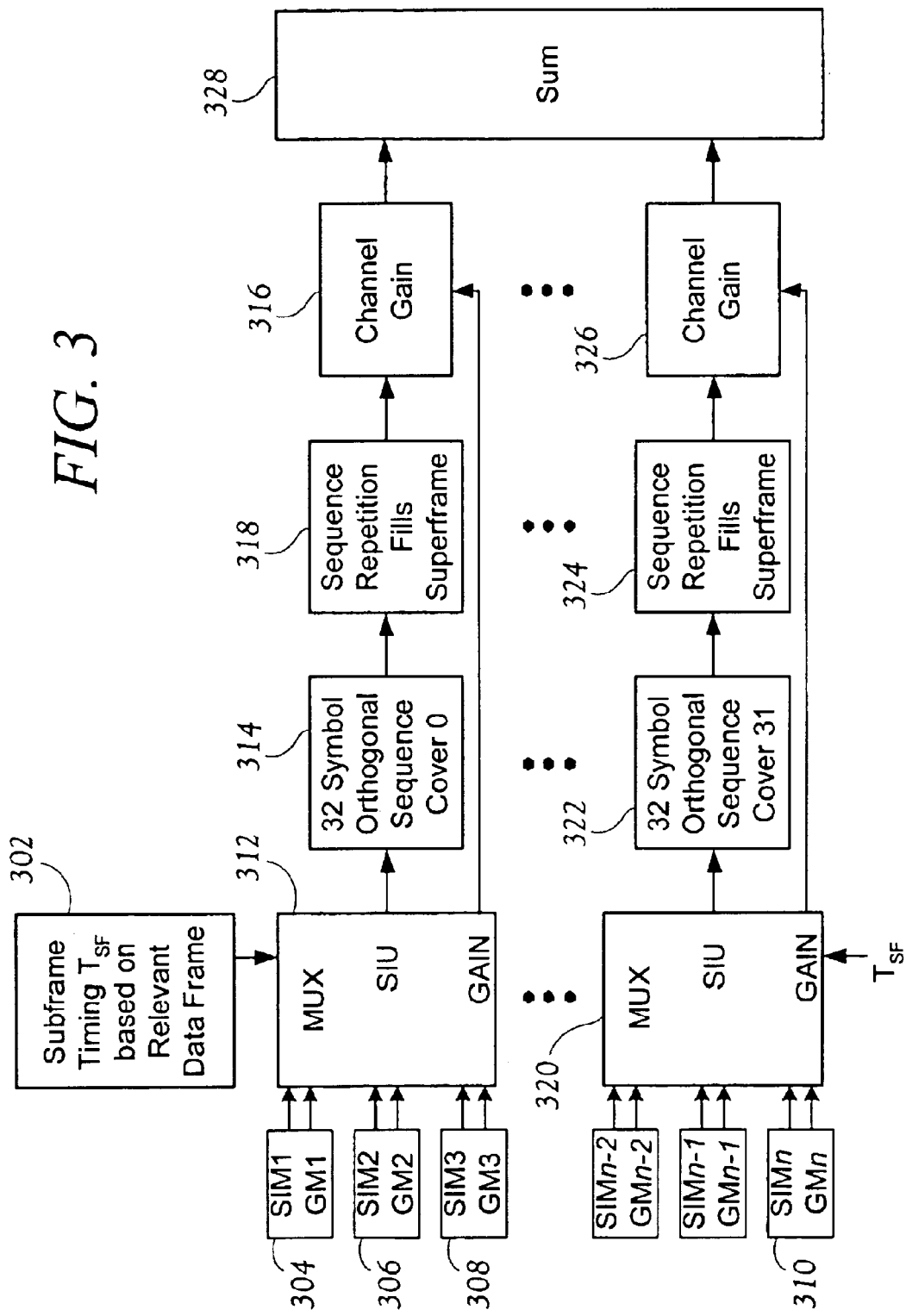
FIG. 3 is a block diagram of base station apparatus modules for preparing a common signaling channel (CSC) for transmission to a multiplicity of receiving MSs.

FIG. 3 illustrates some features of a representative BS transmission system configured to support a CSC. The skilled person will readily adapt the features that are illustrated and described herein to suit the needs of a BS for use in a particular communications system. The channels referenced in FIG. 3 correspond to the channels indicated in FIG. 1, and are merely representative.

In FIG. 3, a block 302 represents BS features that cooperate to determine subframe timing signals $T_{SF}$. The $T_{SF}$ timing signals are generally determined by the duration or period of relevant frames of a corresponding data channel. In the case that the corresponding data channel is a UL data channel, for example, the block 302 may encompass hardware configured to identify the timing and MS source of received signals, together with programmable circuitry to determine slot assignments for each received data frame. The block 302 may also include upper layer processing capabilities configured to determine a time relationship between UL data channel slots and corresponding DL slots for BS transmissions. The block 302 will further include features configured to identify or determine CSC superframe timing. Appropriate times for at least some subframes may be determined within the block 302 by dividing the duration of each superframe by the number of subframes, as predetermined by design or by upper layer processing. The subframes will typically, but not necessarily, have substantially equal length.

The actual SIUs to be conveyed by the CSC may be prepared by upper layer processing, and disposed into queues corresponding to the MS to which such SIUs are relevant. Upper layer processing may also determine an appropriate gain level for each MS. Blocks 304, 306, 308 and 310 represent SIU queues and gain values that have been prepared by upper layer processing for MSs MS1, MS2, MS3 and MSn, respectively. At appropriate times, as determined by the subframe timing determination block 302, a multiplexer 312 selects the SIU(s) and gain value corresponding to a particular MS (1, 2 or 3), and conveys such SIU(s), and such gain, to further channel processing blocks. Such further processing blocks may include an orthogonal coding sequence cover block 314, as well as a channel gain block 316. In the exemplary embodiment, just one SIU, representing a NACK or else an absence of signal, is selected from the appropriate queue by the multiplexer 312 during a subframe. The single SIU is encoded into a single symbol in the encoder 314, according to a predetermined one of 32 orthogonal sequences.

Time Diversity Alternatives

The multiplexer 312 need not necessarily provide both SIU(s) and gain to further channel processing blocks for each subframe period. In the illustrated embodiment, for example, the MUX 312 need only provide SIU(s) to the coding block 314 during three of six subframe periods in an exemplary CSC superframe. During the other three subframe periods, the encoded sequences from the coding block 314 may be duplicated in a block 318 to provide time diversity of the signal. The order of repetition may be selected based on various engineering considerations, but repeating subframes a, b and c (as shown in FIG. 2) during subframes d, e, and f provides greater time separation of the repeated signals.

Numerous variations are possible for providing time diversity of the information. For some CSCs it may be useful to employ two different SIU values to represent the same underlying information. For example, a convention may be established, according to which symbols disposed in one subframe are interpreted differently (e.g., inverted) as compared to the same symbol disposed in a different subframe. Such a convention may permit the same underlying information to be transmitted via different symbols, disposed in different subframes of the same CSC superframe, thus providing not only time diversity, but also signal diversity.

In some embodiments it may be preferred to repeat only certain encoded sequences. Thus, for example, it may be desired to convey two different SIUs during a CSC superframe to each MS sharing the CSC. The first of these two SIUs may be critical to data integrity, and accordingly may be repeated for time diversity. The second of these two SIUs, however, may be less critical (e.g., a future In a somewhat similar manner, symbols representing a more critical SIU may be repeated multiple times within a superframe, while symbols representing a less critical SIU are repeated only once, or not at all. Alternatively, repetition may be varied according to channel conditions, with SUs directed to an MS on a less robust CSC subchannel being repeated, while SIUs directed to an MS on a more robust subchannel are not repeated. Further, the number of subchannels into which a CSC is divided may be reduced, depending upon traffic or channel conditions, and symbols for the remaining subchannels may then be (further) repeated. Thus, multiplexing a CSC into numerous effective channels permits tremendous flexibility for trading off data rate, power, and data reliability.

Similarly as described above with respect to the multiplexer 312, a multiplexer 320 selects SIU(s) and gains from appropriate queues established by higher layer processing, such as the queue 310 that provides SIU(s) and gain relevant to MSn, in accordance with the subframe timing signal $T_{SF}$ generated by the block 302. The SIU(s) appropriate for a particular subframe are conveyed to a block 322 for orthogonal code covering according to an orthogonal sequence. The orthogonal sequence according to which the data is encoded is a different one of (for example) 32 orthogonal sequences than the sequence that is employed in the encoding block 314. Some, or all, of the subframe sequences thus generated in the encoding block 322 may be repeated in a block 324 to provide time diversity. Channel gain may also be modified for each subframe (and thus for each subchannel) in a gain block 326.

The multiplexing, coding, repetition and gain blocks 312, 314, 318 and 316 represent a first subchannel path, and the corresponding blocks 320, 322, 324 and 326 represent a last subchannel path. Any number of intermediate subchannel paths may be included; in the exemplary embodiment there are a total of 32 generally identical subchannel paths. The output from all such paths may be combined in a block 328 as the entire signal of the CSC.

More General Base Station Features for CSC

Figure 4:
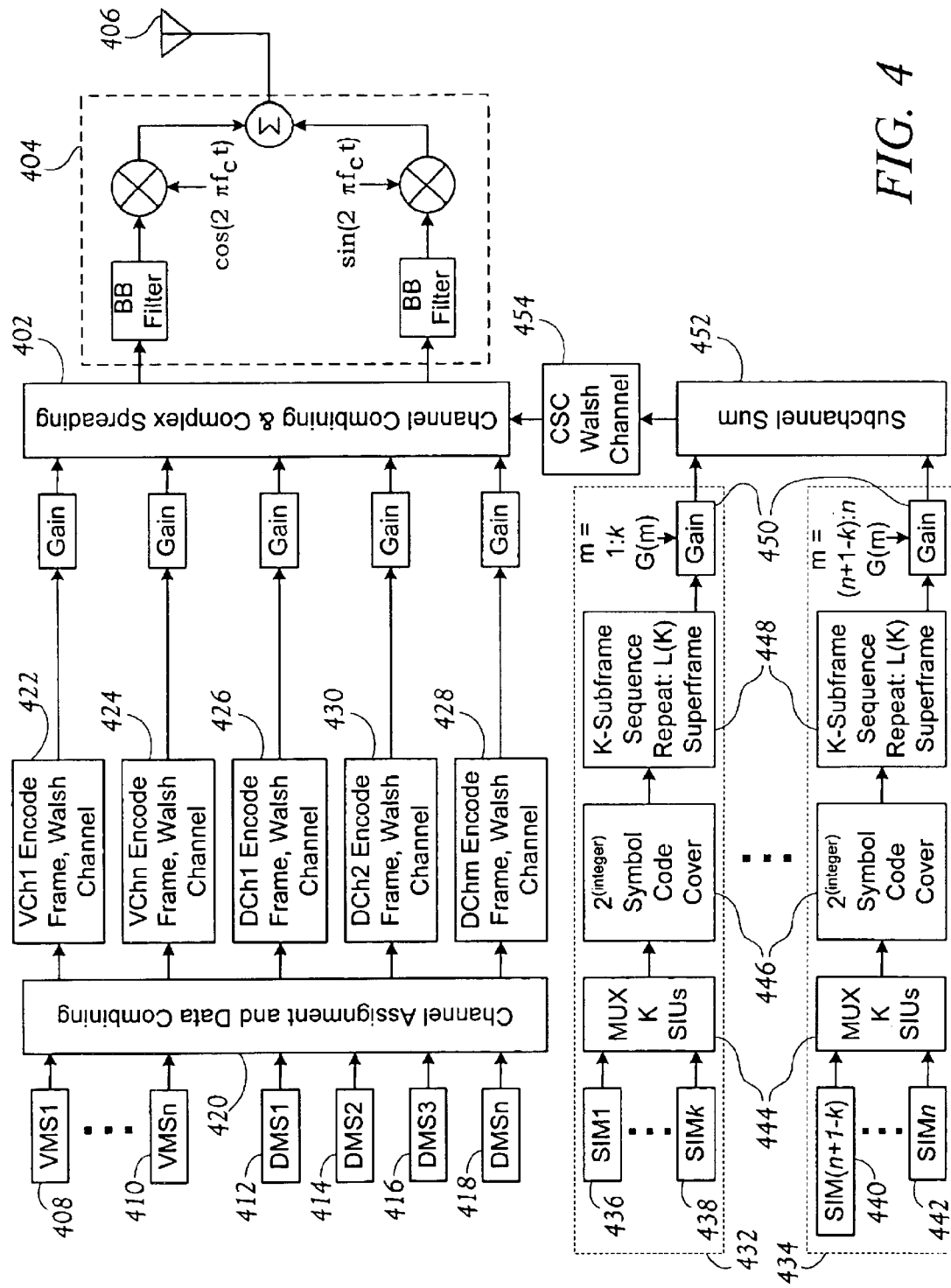
FIG. 4 is a simplified and generalized block diagram of portions of a base station apparatus configured for bidirectional data communications and transmitting a common signaling channel (CSC) to a multiplicity of receiving MSs.

Relevant BS signal processing modules are represented somewhat more generally in FIG. 4. As may be seen, signals conveying information from a number of different channels may be combined in a single channel combining and complex spreading "crossbar" 402, wherein the channels are assigned to I or Q outputs. The I and Q outputs are baseband filtered, quadrature modulated, and summed in antenna signal preparation block 404 for transmission from an antenna 406.

All of the channel data queues may be prepared by higher layer processing. These channels may include voice channels, represented by queue VMS1 408 for a voice channel directed to MS1, and by queue VMSn 410 for MSn. Data channels are represented by a queue DMS1 412 of data intended for MS1, a queue DMS2 414 for MS2, a queue DMS3 416 for MS3, and a queue DMSn 418 for MSn. Data from all of these queues may be directed, via a crossbar 420 controlled by upper layer processing, to appropriate channel processing paths.

For simplicity, examples of appropriate channel processing paths are illustrated opposite the queue(s) that provide the channel data. For example, one voice channel encoding, framing and Walsh channelizing block 422 is illustrated opposite the voice data queue VMS1 408, and another such block 424 is illustrated opposite the queue VMSn 410, suggesting the typical circumstance that a single channel is allocated for each voice channel. Similarly, separate data channel encoding, framing and Walsh channelizing blocks 426 and 428 are each positioned to suggest that they process data only from data queues DMS1 412 and DMSn 418, respectively. However, a data channel encoding, framing and Walsh channelizing block 430 is positioned to suggest that the block 430 processes data from both queues DMS2 414 and DMS3 416. This is merely illustrative of a typical system, in which a data channel path processes data for one or two data channels. In a typical BS, assignment of queues to channel processing paths in the crossbar 420 is substantially under the control of upper communication processing layers.

CSC processing paths are represented by a first CSC processing path 432, which processes subchannels for the first k MSs 1 to k, and by a last CSC processing path 434, which processes subchannels for the last k MSs (n+1–k) to n. These are generally similar to the signal paths illustrated in FIG. 3; however, the BS module that provides subframe timing signals $T_{SF}$ to the multiplexers is not shown, nor is an explicit multiplexer for the appropriate gain value for each subchannel shown.

Each path 432 . . . 434 conveys SIUs from k queues, which are generally intended for k different MSs. (In an exemplary embodiment, the SIUs are ACKs which are usefully transmitted after the shortest consistent delay, so that the SIU queues may be a single register in length.) The k queues are represented, in CSC processing path 432, by a queue SIM1 436 that provides signaling information for a first MS, MS1, and by a queue SIMk 438 that provides signaling information for a kth MS, MSk. In the CSC processing path 434, the k queues are represented by a queue SIM(n+1–k) 440 that provides signaling information for MS(n+1–k), and by a queue SIMn 442 that provides SIUs for MSn. For each CSC processing path, a multiplexer 444 selects SIU(s) from the appropriate queue under control of a subframe timing signal $T_{SF}$ (not shown). The multiplexed signal information is then conveyed to a block 446 for orthogonal coding.

The first and last CSC processing paths 432 and 434 represent a number $N_P$ of such paths. Because each CSC processing path applies a different orthogonal code to the multiplexed signal information in the corresponding block 446, $N_P$ different code covers are required. As such, it may be useful to configure the system so that $N_P$ is an integer power of 2, so as to realize efficiencies in the provision of $N_P$ different orthogonal codes.

Next, similarly as described with respect to FIG. 3, some or all orthogonally encoded subframe signals may be replicated in a subframe repeat block 448. If the block 448 repeats each subframe signal L times (for L-time diversity), the total number of subframes in a superframe output from the block 448 will be L×k. Of course, the numerous alternatives for repetition and providing time diversity that are set forth above with respect to FIG. 3 may also be implemented in processing blocks that differ as necessary from the blocks 448.

The resulting concatenated TDM subchannels now have a length of a CSC superframe. The L concatenated subchannels are conveyed via a gain block 450 to a subchannel summing block 452. Each gain block 450 imposes a gain for each subchannel, multiplexed for the superframe structure by a multiplexer (not shown), in a manner generally similar to that described with respect to FIG. 3. The gain for each subchannel is allocated from a total gain budget that has been assigned by higher level processing to the entire CSC. The gain-adjusted, concatenated TDM subchannels are summed in a block 452 to form the entire CSC, containing k×$N_P$ subchannels. The completed CSC is Walsh channelized in a block 454, then joins the other illustrated channels in the combining and spreading crossbar 402.

Conclusion

The foregoing description illustrates exemplary implementations, and novel features, of aspects of a method and apparatus for hybrid CDM/TDM signaling, providing an efficient CSC, such as may be employed as a F-CACKCH in an exemplary CDMA communications system. Alternative implementations are suggested, but it is impractical to list all alternative implementations of the method and apparatus. Therefore, the scope of the presented invention should be determined only by reference to the appended claims, and should not be limited by features illustrated in the foregoing description except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention is properly defined by the appended claims rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of transmitting a multiplicity of signaling information units (SIUs) from a base station (BS) to a corresponding multiplicity of receiving mobile stations (MSs) via a single common signaling channel (CSC), wherein data is communicated between the BS and each receiving MS, in quantities substantially larger than is conveyed by the SIUs, via one or more other channels that employ a primary frame structure, the method comprising:
   a) determining a primary frame to which the SIUs are implicitly related, the primary frame having a primary frame duration;
   b) defining a CSC superframe at a temporal position that implicitly identifies the superframe as conveying information specifically associated with the primary frame, the superframe having a duration approximately equal to the primary frame duration;
   c) dividing the CSC superframe into a multiplicity of subframes to effect time division multiplexing (TDM) of the CSC superframe; and
   d) disposing, within each subframe, code division multiplexing (CDM) symbols representing a multiplicity of SIUs intended for individual reception by a corresponding multiplicity of receiving MSs.

2. The method of claim 1, further comprising time diversifying an SIU relevant to a particular MS by disposing, in a plurality of different CSC subframes, groups of one or more symbols that each reflect the same SIU relevant to the particular MS.

3. The method of claim 2, wherein step (a) further comprises dividing the CSC superframe into an integer number NSF of subframes such that a maximum number of symbols required to be conveyed in each superframe is $N_{SF}*2^L$, for an integer L.

4. The method of claim 3, wherein the SIUs comprise acknowledgement information relevant to automatic data retransmission procedures.

5. The method of claim 4, wherein each SIU transmitted from the BS to a particular MS corresponds to a single CDM symbol and conveys only acknowledgment information regarding data transmitted from the particular MS to the BS.

6. The method of claim 5, wherein the CSC is a forward Acknowledgment Channel (F-ACKCH) and each CSC superframe is about 10 mS in duration, further comprising dividing each CSC superframe into six subframes each configured to convey a maximum of 32 CDM symbols, and the acknowledgement information intended for each particular MS is transmitted as a CDM symbol in two different subframes of a CSC superframe.

7. The method of claim 1, wherein step (a) further comprises dividing the CSC superframe into an integer number $N_{SF}$ of subframes such that a maximum number of symbols required to be conveyed in each superframe is $N_{SF}*2^L$ for an integer L.

8. The method of claim 1, wherein the SIUs comprise acknowledgement information relevant to automatic data retransmission procedures.

9. The method of claim 1, wherein each SIU transmitted from the BS to a particular MS corresponds to a single CDM symbol and conveys only acknowledgment information regarding data transmitted from the particular MS to the BS.

10. The method of claim 1, wherein the SIUs encoded within a particular CSC superframe each convey information about data transmitted by a particular MS during a primary frame having a common duration and a predetermined time offset with respect to the particular CSC superframe.

11. Cellular communication system base station (BS) apparatus for high-speed data communication with a multiplicity of mobile station (MS) receivers, the apparatus comprising:
   a) a data channel alignment determination module for determining a length and time alignment of primary frames of a multiplicity of data channels; and
   b) a signaling channel signal preparation module for preparing a signal to convey a multiplicity of different signaling information units (SIUs), each corresponding to one of the multiplicity of data channels, for concurrent transmission from the BS via a common signaling channel (CSC), the signaling channel signal preparation module including
      i) a time division multiplexing (TDM) module configured to dispose SIUs into a plurality of different subframe periods within a superframe period having a duration substantially matching the length of the primary frames of the corresponding data channel; and
      ii) a coding module configured to encode the subframe SIUs into signaling channel signal segments as code division multiplexed (CDM) symbols for transmission via the CSC.

12. The apparatus of claim 11, wherein the signaling channel signal preparation module (b) further comprises (iii) a signaling channel time diversity module configured to dispose a plurality of CDM symbols, each reflecting an identical underlying SIU relevant to a particular MS, in a corresponding plurality of different CSC subframes.

13. The apparatus of claim 12, wherein the TDM module (b)(i) is further configured to dispose the SIUs into an integer number $N_{SF}$ of different subframes within the superframe period such that a maximum number of CDM symbols required to be conveyed in the superframe is $N_{SF}*2^L$ for an integer L.

14. The apparatus of claim 13, wherein the SIUs comprise acknowledgement information relevant to automatic data retransmission procedures.

15. The apparatus of claim 14, wherein each SIU conveyed from the BS to a particular MS on the CSC corresponds to a single CDM symbol that conveys only acknowledgment information regarding data transmitted from the particular MS to the BS.

16. The apparatus of claim 15, wherein the (b)(i) TDM module is configured to dispose SIUs in three subframes, and the (b)(ii) coding module codes each SIU in one of 32 orthogonal sequences.

17. The apparatus of claim 11, wherein the TDM module (b)(i) is further configured to dispose the SIUs into an integer number $N_{SF}$ of different subframes within the superframe period such that a maximum number of CDM symbols required to be conveyed in the superframe is $N_{SF}*2^L$ for an integer L.

18. The apparatus of claim 11, wherein the SIUs comprise acknowledgement information relevant to automatic data retransmission procedures.

19. The apparatus of claim 11, wherein each SIU conveyed from the BS to a particular MS corresponds to a single CDM symbol that conveys only acknowledgment information regarding data transmitted from the particular MS to the BS.

20. A method of concurrently transmitting a multiplicity of signaling information units (SIUs) from a base station (BS) to a corresponding multiplicity of receiving mobile stations (MSs) via a single common signaling channel (CSC), comprising:

a) a step for establishing a primary frame length of data channel frames to which the SIUs correspond;

b) a step for establishing superframes of the CSC having substantially the primary frame length;

c) a step for transmitting the CSC superframes at a time that implicitly identifies which frame of each data channel corresponds to SIUs in the CSC superframe;

d) a step to effect time division multiplexing (TDM) of the CSC superframe periods into a plurality of subframes; and e) a step to dispose, within each subframe, code division multiplexing (CDM) symbols representing one or more SIUs specific to each of a multiplicity of different MSs.

* * * * *